United States Patent [19]
Olin et al.

[11] Patent Number: 5,880,365
[45] Date of Patent: Mar. 9, 1999

[54] THERMAL MASS FLOW SENSOR

[75] Inventors: John G. Olin, Carmel Valley; David M. Korpi, Salinas; Donald I. Ross, Huntington Beach, all of Calif.

[73] Assignee: Sierra Instruments, Inc., Monterey, Calif.

[21] Appl. No.: 785,535

[22] Filed: Jan. 17, 1997

Related U.S. Application Data

[63] Continuation of Ser. No. 145,409, Oct. 29, 1993.

[51] Int. Cl.$^6$ ....................................................... G01F 1/68
[52] U.S. Cl. ..................................... 73/204.25; 73/204.22
[58] Field of Search ........................... 73/204.15, 204.22, 73/204.25, 204.27

[56] References Cited

U.S. PATENT DOCUMENTS 5,207,765   5/1993   Eiermann et al. .................... 73/204.26

*Primary Examiner*—Harshad Patel
*Attorney, Agent, or Firm*—LaRiviere, Grubman & Payne, LLP

[57] ABSTRACT

A thermal mass flow rate sensor is made of a resistance temperature detector wire wound around a mandrel. A metal sheath is formed about the mandrel and wire assembly to be in intimate contact with the mandrel and wire assembly. The materials of which the sensor is made are selected such that their co-efficients of thermal expansion are approximately the same.

8 Claims, 9 Drawing Sheets

PRINCIPLE OF OPERATION OF THERMAL MASS FLOW SENSOR OF THE INVENTION

THERMAL MASS FLOW SENSOR PAIR

ELECTRONIC DRIVE FOR THERMAL MASS FLOW METERS

THERMAL MASS FLOW METER

MULTI-POINT INSERTION THERMAL MASS FLOW METER

AN IN-LINE THERMAL MASS FLOW METER

PRINCIPLE OF OPERATION OF CONVENTIONAL THERMAL MASS FLOW SENSOR

PRINCIPLE OF OPERATION OF THERMAL MASS FLOW SENSOR OF THE INVENTION

ELECTRICAL ANALOG MODEL FOR THE THEORY OF OPERATION
OF THERMAL MASS FLOW SENSORS

HYDROPLASTIC FORMING OF TIP SHEATH

THERMAL MASS FLOW SENSOR

This application is a continuation of Ser. No. 08/145,409 filed Oct. 29, 1993.

BACKGROUND OF THE INVENTION

1. Field of the Invention

The present invention relates to the field of fluid flow measurement, and in particular to measurement of fluid flow by means of thermal mass flow meters.

2. Prior Art

Figure 1:
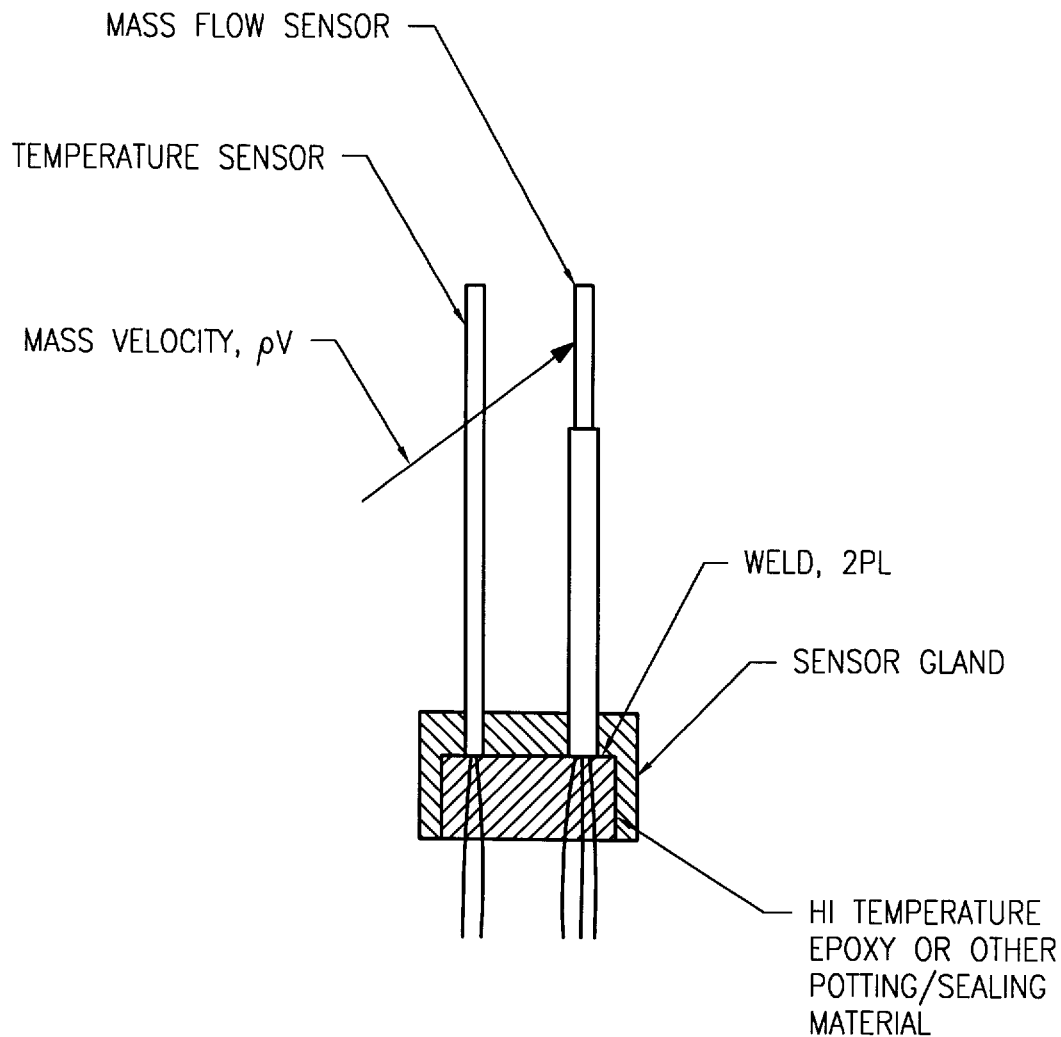
Figure 2:
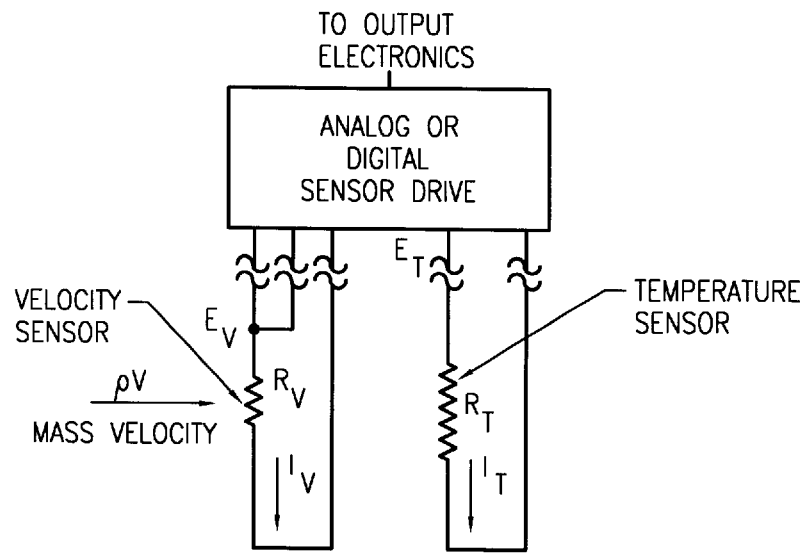

As shown in FIG. 1, TMFMs have two sensors immersed in a flowing fluid—a thermal mass flow sensor (TMFS) that monitors the mass flow of the flowing fluid and a temperature sensor that monitors the fluid's temperature and automatically corrects for temperature changes. In most current applications of TMFMs the fluid is a gas. Therefore, hereinafter the term "fluid" shall be referred to as "gas". In most conventional TMFMs, each sensor is a reference-grade platinum resistance temperature detector (RTD) wound on a ceramic mandrel and inserted into a tubular corrosion-resistant metallic sheath, or thermowell. The TMFS's RTD has a much lower resistance than the temperature sensor's RTD and is self-heated by the electronics to a temperature above the gas temperature, thereby creating the potential for the transfer of heat from the TMFS to the flowing gas stream. As will be shown later, the quantity directly monitored by TMFMs is the mass velocity ($\rho V$), where $\rho$ is the mass density of the gas and V is its velocity. Conventionally, the electronics is an analog bridge circuit, but it can also be an all-digital, microprocessor-based sensor drive, as shown in FIG. 2.

Figure 3:
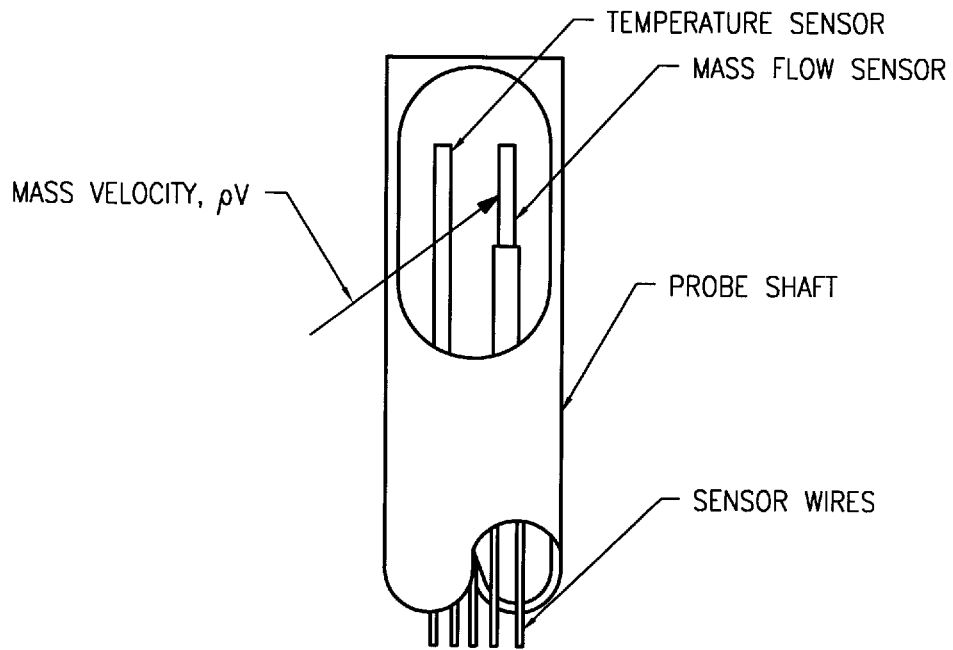
Figure 4:
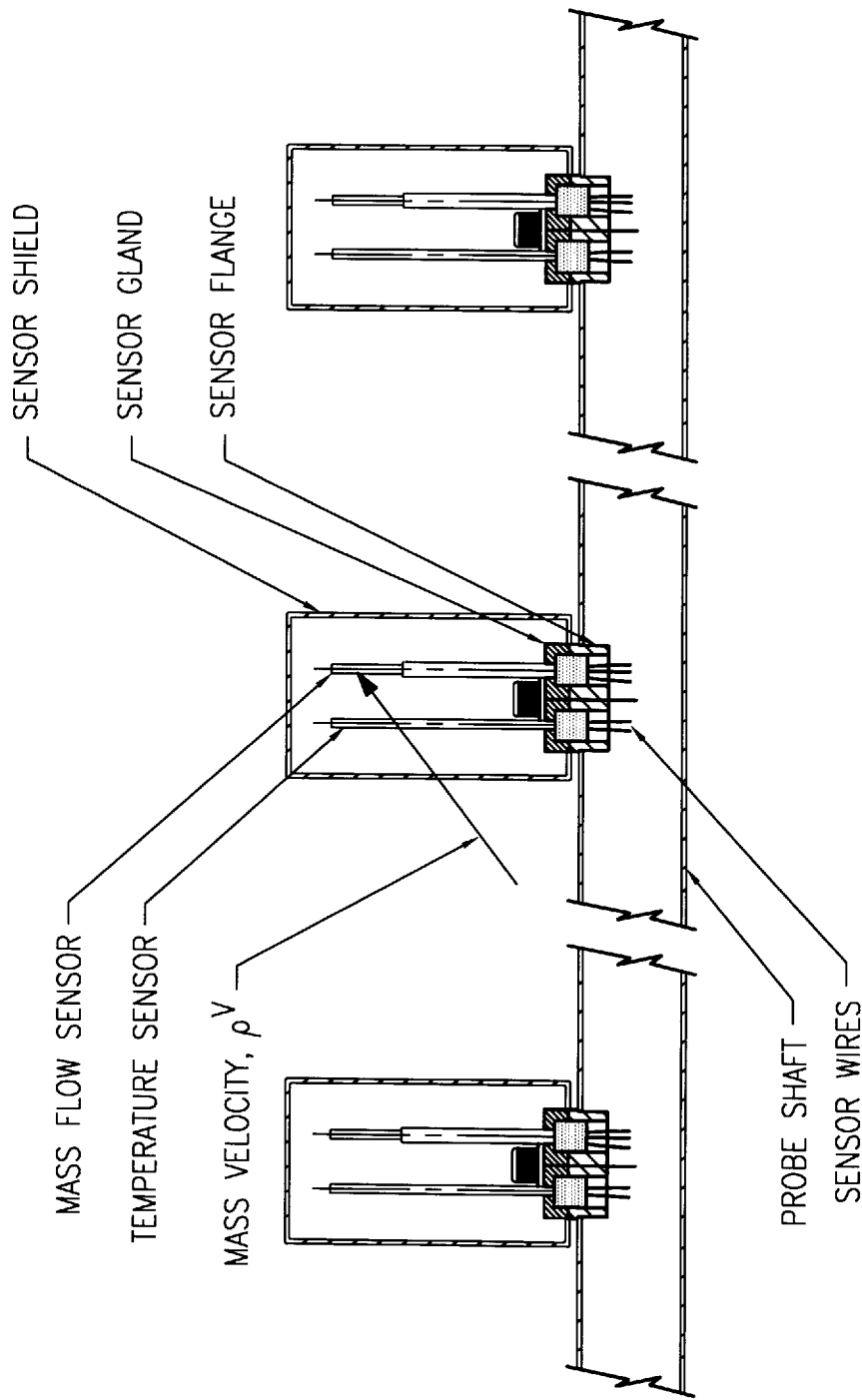
Figure 5:
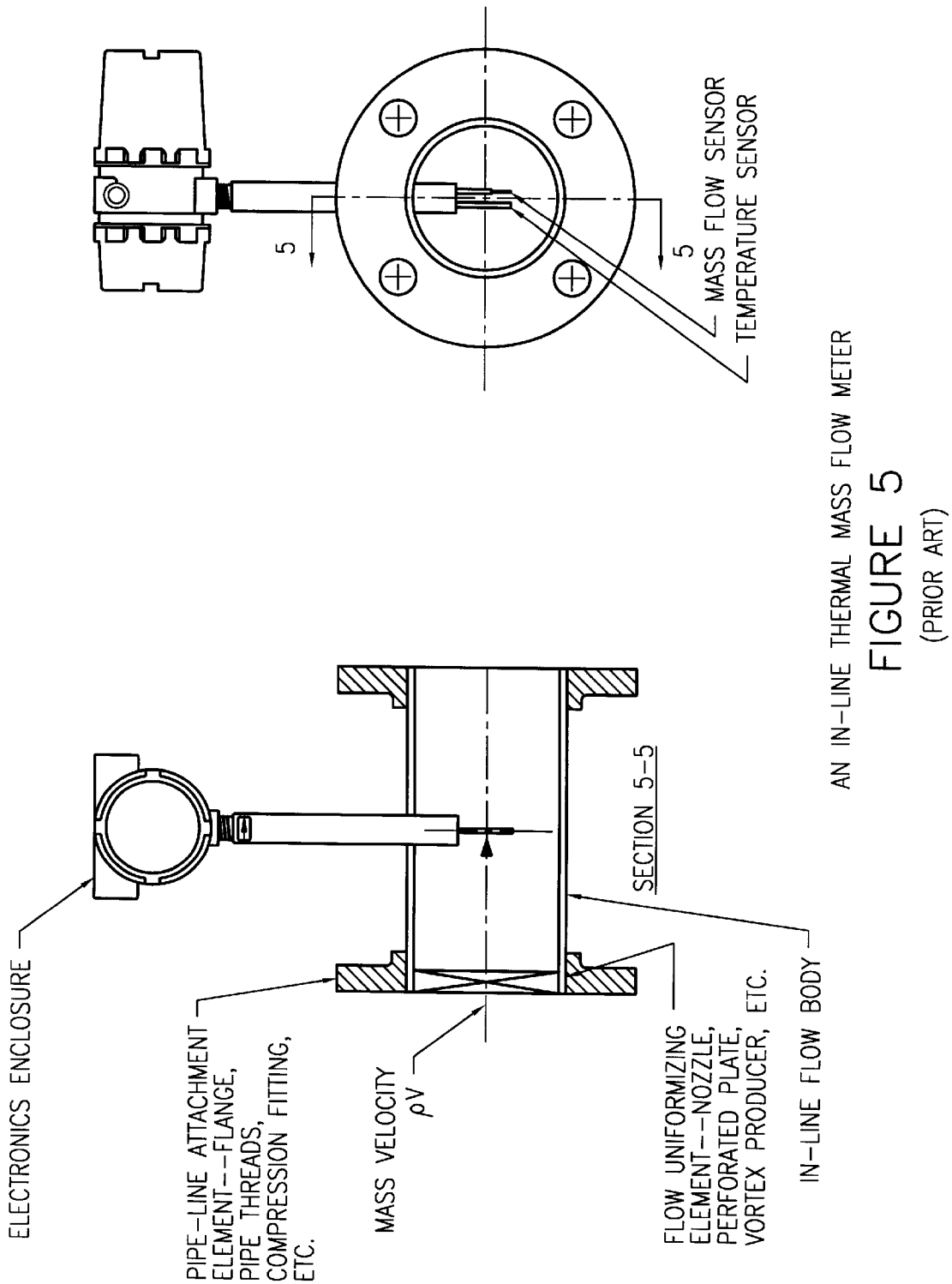

FIGS. 3, 4, and 5 show typical configurations of TMFMs. The single-point insertion TMFM shown in FIG. 3 is inserted into ducts, stacks, and pipes. The mass flow rate ($\dot{m}$) in the channel is measured as the product of the monitored quantity ($\rho V$) and the cross-sectional area (A) of the pipe or duct, that is, $\dot{m} = \rho V A$ As shown in FIG. 4, multi-point insertion TMFMs in arrays of typically 2 to 50 sensors monitor the total mass flow rate ($\dot{m}$) in large ducts, stacks, and pipes. Multi-point TMFMs are configured by dividing the channel's cross-sectional area (A) into n equal areas and locating a thermal sensor pair at the centroid of each equal area (A/n). Thus, the total mass flow ($\dot{m}$) in the channel is computed by the electronics as:

$$\dot{m} = \sum_{i=1}^{n} \dot{m}_i = \frac{A}{n} \sum_{i=1}^{n} (\rho V)_i \qquad (1)$$

where ($\dot{m}_i$) and ($\rho V$), are the mass flow rate and mass velocity monitored by each sensor, respectively.

In-line TMFMs, like the flanged unit shown in FIG. 5, monitor the mass flow of gases in pipes or tubes. In-line flow meters typically are calibrated directly in terms of mass flow rate ($\dot{m}$) with the actual gas.

II. PRINCIPLE OF OPERATION OF THERMAL MASS FLOW METERS

Figure 6:
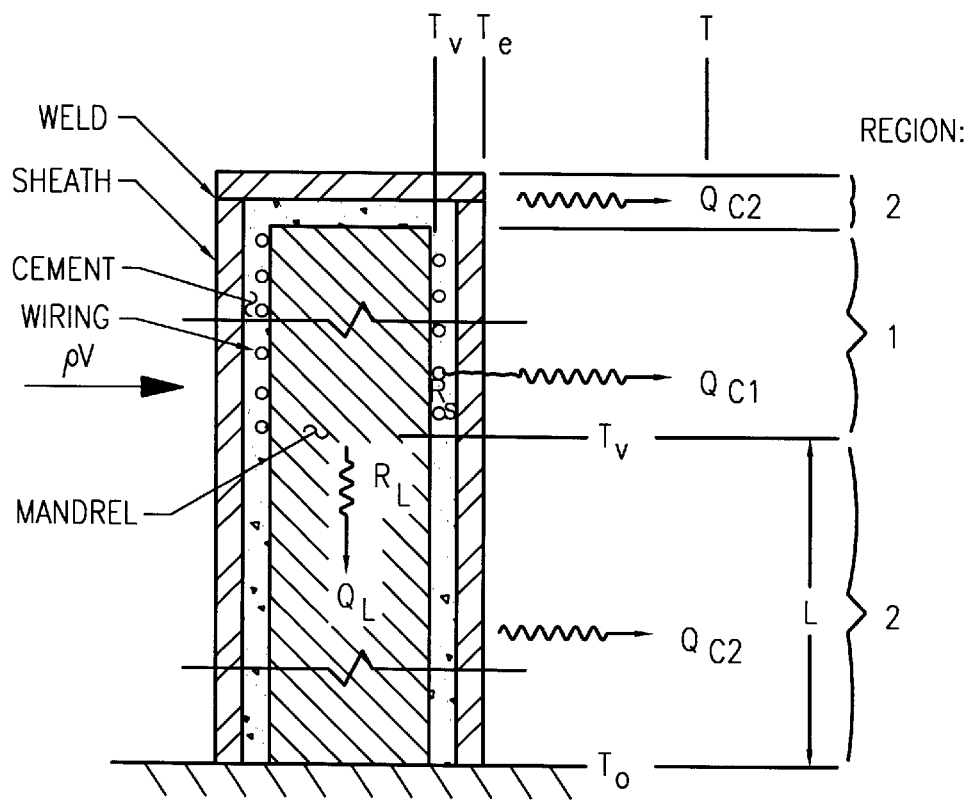
Figure 7:
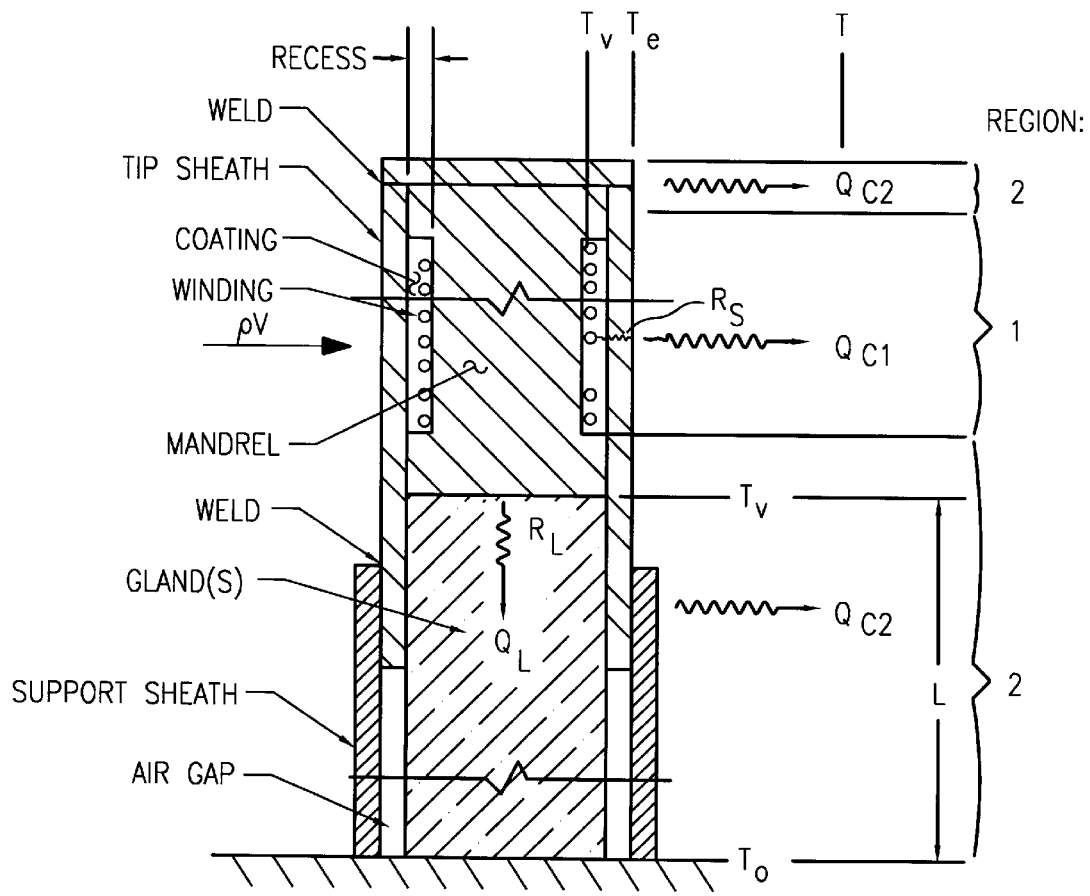

FIGS. 6 and 7 show the principle or operation of conventional TMFSs and that of the invention, respectively. Theoretically, the principle of operation of TMFSs is based on the first law of thermodynamics, which states that the electrical power ($E_V^2/R_V$) supplied to the TMFS by the electronics, as shown in FIG. 2, is equal to the heat convected away by the flowing gas stream plus the "end loss" heat conducted through the stem of the sensor to the probe shaft or flow body at temperature $T_O$; thus:

$$E_V^2/R_V = Q_{C1} + Q_{C2} + Q_L \qquad (2)$$

where:
- $Q_{C1}$=Convective heat transfer from Region 1 in FIGS. 6 & 7,
- $Q_{C2}$=Convective heat transfer from Region 2 in FIGS. 6 & 7,
- $Q_L$="End loss" heat conduction.

The convective heat transfer rates $Q_{C1}$ and $Q_{C2}$ depend on the quantity we desire to measure, $\rho V$. In conventional TFMS's and in the TMFS of this invention $Q_{C1}$ is greater than $Q_{C2}$ and dominates convective heat transfer.

It is the molecules (and hence mass) of the flowing gas that interact with the heated boundary layer surrounding the TMFS and convect away the heat. Hence, the TMFM directly monitors mass flow rate.

Figure 8:
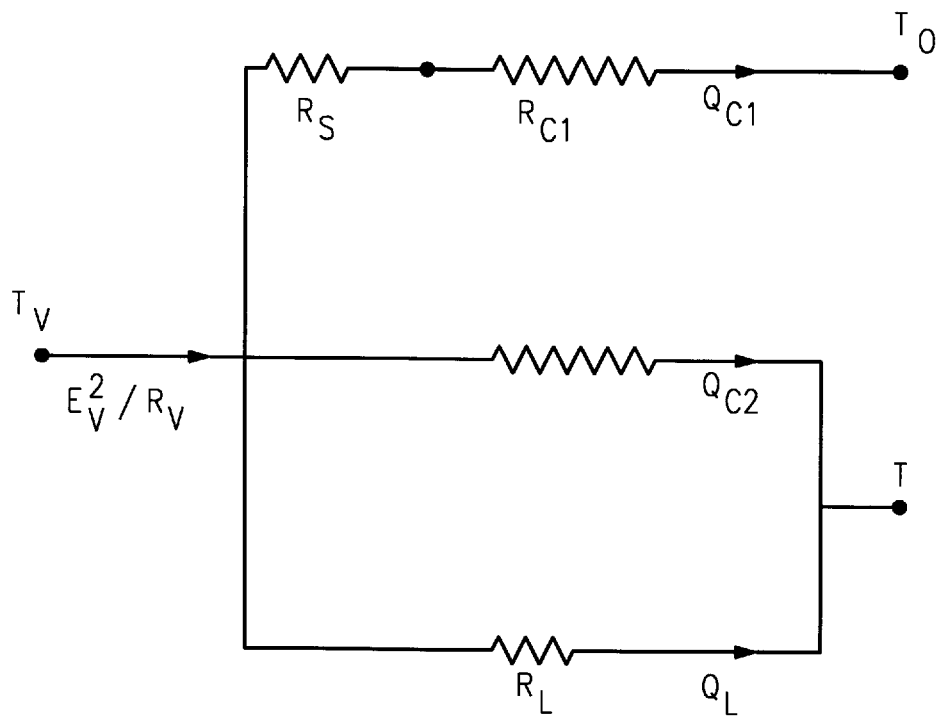

FIG. 8 shows an electrical analog model for the theory of operation of TMFSs. The thermal resistances and temperatures in FIG. 8 are also shown in FIGS. 6 and 7. Although this model is approximate, it is useful in describing the problems of conventional TMFSs and how the invention solves them.

In the electrical analog model the heat transfer rates, $E_V^2/R_V$, $Q_{C1}$, $Q_{C2}$, and $Q_L$, are the equivalent of electrical currents. In the electrical analog model, temperature is the equivalent of electrical voltage. The temperatures used in the description are defined as follows:

- $T_V$=The temperature of the RTD winding,
- $T_e$=The temperature of the external surface area of the TMFS,
- T=The temperature of the flowing gas measured continuously by the temperature sensor, and
- $T_O$=The temperature of the probe shaft or flow body of the TMFM at the end of the sensor's stem.

The thermal resistances—the equivalent of electrical resistance used in this description—are defined as:

$R_{C1}=1/h_1 A_1$=The "convective" thermal resistance for convective heat transfer from the external surface in Region 1 of the TMFS at temperature $T_e$ to the gas at temperature T. h is the film coefficient. $A_1$ is the external surface area of the TMFS in Region 1. The product $h_1 A_1$ usually is expressed empirically as $h_1 A_1 = a_1 + a_2 (\rho V)^m$, where $a_1$, $a_2$, and m are empirically determined constants depending on the thermal conductivity, viscosity, and heat capacity of the gas, as well as sensor geometry. Again, $\rho V$ is the mass velocity of the gas.

$R_S$=The "skin" thermal resistance for conductive heat transfer from the winding at temperature $T_V$ to the external surface of the TMFS at temperature $T_e$. In the case of conventional TMFSs, $R_S$ is the sum of the thermal resistance for radial conduction through the cement plus the sheath. In the case of the TMFS of the invention, $R_S$ is the sum of the thermal resistance for radial conduction through the coating plus the tip sheath.

$R_L$=The "end loss" thermal resistance for conductive heat transfer from the winding at temperature $T_V$ to the probe shaft or flow body at temperature $T_O$. The length L shown in FIGS. 6 and 7 is the axial distance from the winding to the probe shaft or flow body. $R_L$ is the equivalent thermal resistance of two parallel thermal resistances—one related to axial conduction through the sheath and the other related to axial conduction through the mandrel in the case of the conventional TMFS and through the gland in the case of the TMFS of the invention.

Applying the laws of electrical circuit analysis, we arrive at these relationships:

$$Q_{C1} = \frac{T_V - T}{R_{C1} + R_S} \quad (3)$$

$$Q_L = \frac{T_V - T_O}{R_L} \quad (4)$$

Combining Equations (3) and (4) with Equation (2), we arrive at:

$$E_V^2/R_V = \frac{[a_1 + a_2(\rho V)^m](T_V - T)}{1 + [a_1 + a_2(\rho V)^m]R_S} + Q_{C2} + \frac{T_V - T_O}{R_L} \quad (5)$$

This is the form of the first law of thermodynamics for the TMFS that is used later to describe the virtues of the invention. Equation (5) can be solved algebraically for the desired quantity $\rho V$ as a function of the measured quantity $E_V^2/R_V$ and other parameters. Microprocessor-based sensor drives use an explicit empirically-determined expression of $\rho V$ as a function of $E_V^2/R_V$ and T based on Equation (5) to calculate $\rho V$.

The sensor drive electronics shown in FIG. 2 is normally operated in one of two modes:

(1) As a "constant-temperature" TMFM in which the electronics maintains constant the temperature differential $\Delta T = T_V - T$.

This mode has two common types:

(a) The first type is an all-digital sensor drive which is capable of maintaining ($\Delta T$) constant within a few percent, even when the gas temperature (T) changes. In this case, the basic output is the electrical power $E_V^2/R_V$ in Equation (5). For example, for $\Delta T$'s of 50° to 150° C. the output may range nonlinearly from 0.5 to 10 watts over the air flow range of 0 to 60 standard meters per second for gas temperatures ranging from 0° to 250° C. The digital sensor drive automatically corrects for changes in gas temperature T by using algorithms for the temperature dependence of the terms $a_1$ and $a_2$ in Equation (5) which are obtained by flow calibration.

(b) The second type is an analog constant ratio bridge sensor drive in which the TMFS and the temperatures sensor are part of the legs of a forced-null analog Wheatstone bridge circuit which maintains constant the ratio of the resistance on each side of the bridge. In this case, the basic output is the voltage across the bridge, commonly called the "bridge voltage". This type of sensor drive selects combinations of fixed resistors in the bridge to make the bridge voltage for a given mass flow identical to two, or more, gas temperatures (T). This process is commonly referred to as "temperature compensation". This sensor drive is not a true constant-temperature TMFM because $\Delta T$ has some variation when the gas temperature changes.

(2) As a constant-power TMFM in which the electronics maintains constant the electrical power $(E_V^2/R_V)$ in Equation (5). In this case, the basic output is the temperature differential $\Delta T$. A subset of this mode of sensor drive is a constant-current anemometer which maintains constant the current $(I_V)$ through the TMFS and has $\Delta T$ as the basic output.

The benefits of this invention apply to any kind of sensor drive electronics.

III. THE UNDESIRABLE EFFECTS OF SKIN RESISTANCE AND END LOSS

Using the preceding equations, we can study the effects of the two undesirable phenomena in TMFMs—skin resistance and end loss. The sensitivity of a TMFM is the first derivative of its basic output with respect to the desired quantity $\rho V$. In the case of the constant-temperature TMFM with digital drive the sensitivity is $d(E_V^2/R_V)/d(\rho V)$ evaluated assuming other variables are constant.

By inspecting Equation (5), we see that as $R_S$ increases, the sensitivity of the TMFM decreases and that this effect is increased as the mass velocity ($\rho V$) increases. For this reason $R_S$ should be minimized in the design of a TMFS. The invention does this. Furthermore, if $R_S$ is not constant, but varies due to a design which is subject to instabilities, the sensitivity and output will shift as evidenced by Equation (5)—both of which can cause unacceptable measurement errors. The invention provides for a highly stable skin thermal resistance ($R_S$) which eliminates such shifts.

Equation (5) is also instructive in studying the undesirable effect of end loss. As evidenced by Equation (5), the output will shift if the end loss heat transfer rate $Q_L$ changes. To understand what can cause $Q_L$ to vary we shall rewrite Equation (4) as follows:

$$Q_L = \frac{\Delta T + T - T_O}{R_L} \quad (6)$$

In the case of the constant-temperature TMFM with digital sensor drive, the temperature differential $\Delta T = T_V - T$ is maintained constant. Therefore, three phenomena can cause $Q_L$ to vary: (1) T changes; (2) $T_O$ changes; or (3) $R_L$ changes.

In most TMFM applications T does vary, and, to a lesser extent, $T_O$ can vary. The effect of changes in $Q_L$ are minimized by: (1) maximizing $R_L$ by the choice of low thermal conductivity materials and maximizing the length L in FIGS. 6 and 7 so that $Q_L$ is a small fraction of $Q_{C1}$ and (2) by making the end loss thermal resistance $R_L$ stable. The invention does this.

Although the above conclusions regarding the effects of skin resistance and end loss were deduced using the case of the constant-temperature TMFM with digital sensor drive, they are valid for other modes of sensor drive.

IV. THE DESIGN OF CONVENTIONAL THERMAL MASS FLOW METERS

The conventional TMFMs currently in use for gas mass flow monitoring at the time of the disclosure of this invention, is shown in FIG. 6. It is constructed of a resistance temperature detector (RTD) wire wound around a ceramic mandrel. This subassembly is inserted into a sealed tubular metal sheath, or thermowell, and is bonded to the internal surface of the sheath by means of a high temperature ceramic cement. In practice, the RTD wire usually is reference-grade platinum; the ceramic mandrel is aluminum oxide; and the sheath is a corrosion-resistant metal such as 304 Stainless Steel, 316 Stainless Steel, Hastelloy, or an Inconel alloy.

If used for long periods of time in a gas stream which undergoes wide variations in temperature, the differences in the coefficients of thermal expansion of the winding, mandrel, and the sheath causes stresses which can fracture and crack the cement. If this occurs, the thermal skin resistance ($R_S$) between the winding and the external surface of the sensor is changed and probably increased. This causes an error in the measurement of mass flow. Flows with variations in gas temperature include: the flow in the stack of fossil-fueled electric power plants, or in the duct work leading thereto; primary and secondary air flows in fossil-fueled electric power plants; or in any process channel when process gas is caused to be heated or cooled.

Depending on its thickness, the cement in current TMFS's increases the thermal resistance ($R_S$) which has the effect of reducing the sensitivity of the mass flow sensor, as previously demonstrated. Eliminating the cement has the desirable effect of increasing the sensitivity of the TMFM. Furthermore, since typical manufacturing processes are unable to precisely control the thickness of the cement around the winding, the thickness may have azimuthal variations around winding. This causes azimuthal variations around the TMFS which in turn causes measurement errors in flows which have varying direction, such as the swirling flows found in ducts or stacks downstream of fans, elbows, or other flow disturbances.

The TMFS of this invention eliminates the cement together, thereby eliminating all measurement errors associated with its presence.

Another source of measurement error in conventional TMFM's is the "end loss" ($Q_L$), which is a small, but significant, fraction of $E_V^2/R_V$. For example, a TMFS located in the flow body of an in-line flow meter conducts end loss through the flow body to the ambient environment outside the pipe. If the temperature ($T_O$) of the ambient environment changes, the end loss ($Q_L$) changes, causing measurement errors. TMFS's currently in use typically have the ceramic mandrel down their entire length. The relatively high thermal conductivity of aluminum oxide and other ceramics commonly employed results in a reduced end loss resistance ($R_L$) which increases the end loss ($Q_L$), making the TMFS more sensitive to changes in $T_O$. The TMFS of this invention has a relatively high value of $R_L$, resulting in less sensitivity to changes in $T_O$.

V. THE DESIGN OF THE THERMAL MASS FLOW SENSOR OF THE INVENTION

A. General Improvements Provided by the Invention

The TMFS of the invention provides three improvements in the design of conventional TMFS's:

(1) Reduces and stabilizes skin resistance, (2) Improves the sensor's stability, and (3) Reduces end loss.

Reducing skin resistance improves sensitivity, and thereby accuracy and performance, of the TMFS. Stabilizing skin resistance removes the effects its changes makes on the accuracy and repeatability of the TMFS. Improving the TMFS's stability improves its repeatability and reproducibility. Reducing end loss makes the TMFS insensitive to changes in the temperature of the sensor housing or flow body, thereby preserving specified accuracy.

B. Reduction and Stabilization of Skin Resistance and Improvement In Sensor Stability The TMFM of the invention is shown in FIG. 7. It is constructed of a resistance temperature detector (RTD) wire wound around the recessed diameter of a cylindrical ceramic mandrel. Subject to certain limitations regarding its coefficient of thermal expansion to be subsequently described herein, the RTD wire can be any stable material meeting the purpose of the invention, such as platinum, reference-grade platinum, Balco wire, or other metallic or metallic-alloy materials. The recess should have as minimal a depth as practicable, such as several thousandths of an inch. Subject to certain limitations regarding its thermal coefficient of expansion subsequently described herein, the mandrel material can be any stable material meeting the purposes of the invention, such as ceramics, glasses, epoxies, polymers, etc. The mandrel has two relatively small axial holes in which two metallic lead wires are inserted. The mandrel is notched at both ends of the recess to facilitate the welding of one lead wire to one end of the winding and the other lead wire to the other end of the winding. A coating is applied over the RTD winding in the recess. Subject to certain limitations regarding its coefficient of thermal expansion to be subsequently described herein, the coating can be any stable material for coating or potting which meets the purpose of this invention, such as a cement, a cement mixture with ceramic particles, a high temperature cement, epoxy, etc. After drying, the coated mandrel is machined (for example, by centerless grinding) to a precise uniform outside diameter. The mandrel subassembly is inserted into the thin-walled, tubular tip sheath. Subject to certain limitations regarding its coefficient of thermal expansion to be subsequently described herein, the tip sheath can be of any stable material meeting the purposes of this invention such as ceramic, metals, metal alloys, polymers, platinum, or platinum alloys, etc. The tip sheath has a precise internal diameter and a thin wall circular cap of the same material welded to its end. The precision of the outside and inside diameters of the two ports is such that their diametral clearance is minimal. A diametral clearance of 0.001 inch is typical. The tip sheath is inserted into, and welded to, the thin-walled, metallic tubular support sheath which has an internal diameter only slightly larger than the outside diameter of the tip sheath.

Figure 9:
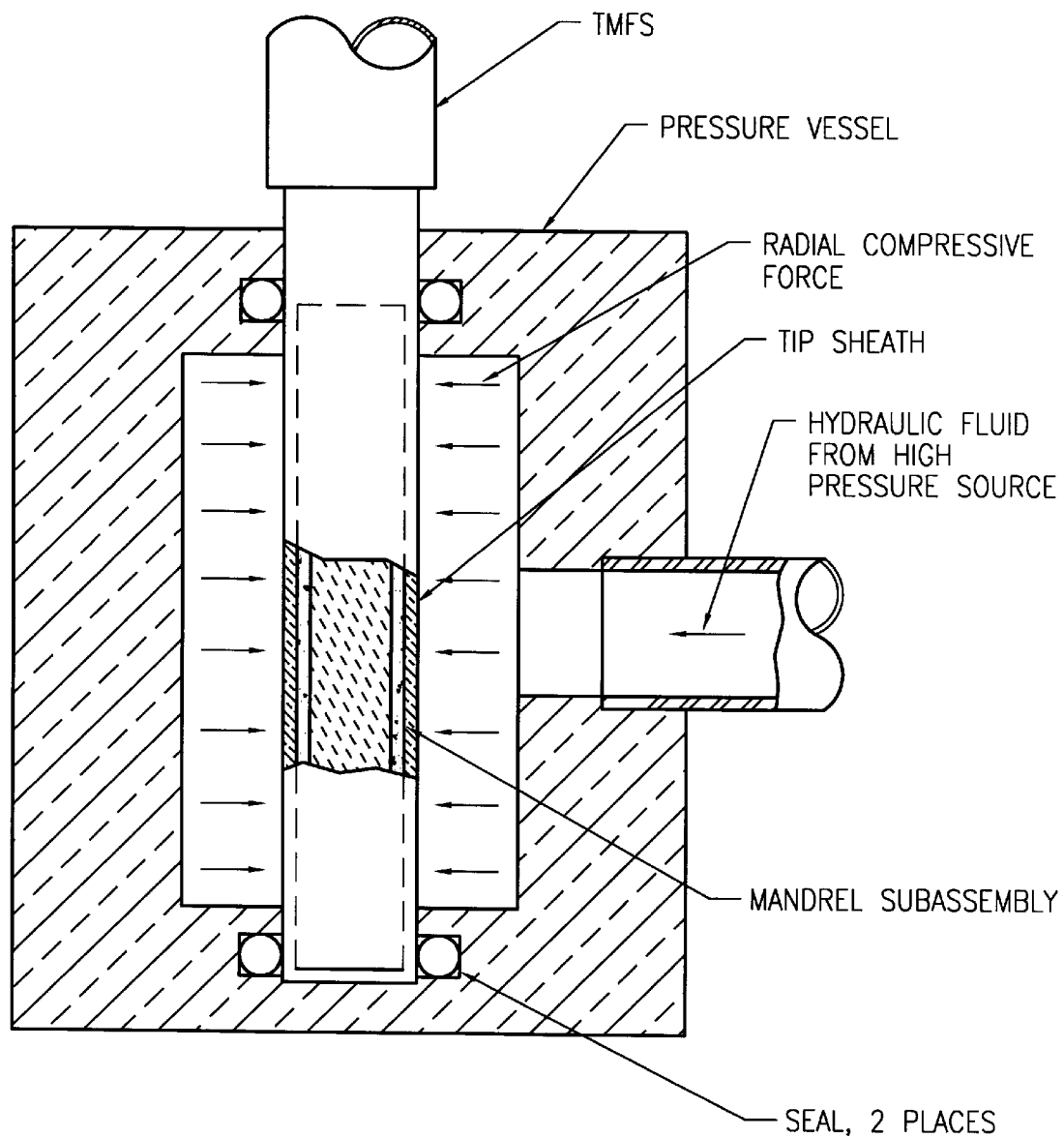

The tip sheath portion of this weldment is inserted into a pressure vessel containing hydraulic fluid, as shown in FIG. 9. Liquid seals, such as "O" rings, isolate the length of the tip sheath covering the windings. The hydraulic fluid is pressurized to a pressure capable of creating a compressive radial force on the outside diameter of the tip sheath which generates stresses within the tip sheath exceeding the ultimate strength of the material of which it is comprised. This then plastically deforms the tip sheath radially inwardly until the internal diameter of the tip sheath conforms to the outside diameter of the mandrel subassembly, thereby creating physical contact between the two parts with negligible air gap. We shall call the above process "hydroplastic forming". A criterion for the choice of the material for the tip sheath is that it successfully undergoes hydroplastic forming; that is, it deforms at reasonably achievable hydraulic pressures and that it closely conforms to the external diameter of the mandrel assembly.

The materials of the tip sheath, mandrel and coating are selected so they have a coefficient of thermal expansion which is close to that of the RTD winding. The purpose of this proper choice of materials is to insure that the relative axial and radial movement between the mandrel subassembly and the internal surface of the tip sheath is sufficiently small when the gas temperature changes so that any resulting changes in the dimensions of the TMFS or the thermal resistance of any air gaps has a negligible, or sufficiently small, effect on heat transfer rates, thereby facilitating repeatable, reproducible measurement of gas mass flow rate.

Further criteria for the selection of the material for the tip sheath can include, depending on the application for which the TMFS is intended, the following: ruggedness, chemical and physical stability, and corrosion resistance (for example, to sulfuric acid found in the stack gases of coal-fired electrical power plants).

This invention also covers any other process having the same purpose as hydroplastic forming: to create or insure, without the use of cements, greases, or any other intervening bonding or potting materials, the stable physical intimate contact between the internal diameter of the tip sheath and the external diameter of the mandrel assembly with an air gap sufficiently small to have a negligible, or very small, thermal resistance. In a properly constructed TMFS of the invention the radial air gap is a small fraction of 0.001 inch. For example, this invention covers any process by which suitable material is electroformed, coated, plated, or in any way deposited over the mandrel subassembly thereby achieving the purpose of the invention. Any such coating, plating, or deposition material must also have the other properties of the tip sheath material required of the invention, as well as other practical characteristics that may be required for the application, such as ruggedness, corrosion resistance, and chemical and physical stability.

The aforementioned improvements in the TMFS of the invention reduce and stabilize skin resistance and improve its overall stability.

C. Reduction of End Loss

Continuing with the description of the TMFS of the invention, we again refer to FIG. 7. Following the hydroplastic forming or equivalent process, the mandrel subassembly is further secured and sealed within the tip sheath by means of any stable bonding, cementing, or potting material meeting the purpose of the invention, such as cements, high-temperature cement, or epoxy, etc.

One or more glands with two relatively small axial holes to accommodate the two lead wires are slipped over the two lead wires. The gland(s) extend(s) the remaining length of the TMFS within the support sheath up to the point, as shown in FIG. 7, where metallic wires are attached to the two leads. One or two wires are attached to the end of one lead wire and one wire is attached to the end of the other lead wire. The wires connect the TMFS directly to the sensor drive electronics shown in FIG. 2 or to an intervening terminal trip. The wires are coated with a suitable insulation to prevent shorting and to provide dielectric strength, as well as to protect the wires from corrosives present in the application for which the TMFM is intended. The insulation must be capable of withstanding the temperatures encountered by the sensor housing or flow body of the TMFM. In ambient temperature applications, insulation can be a suitable polymer such as vinyl. For intermediate temperatures up to approximately 250° C., it can be a high temperature polymer, such as a fluorocarbon polymer, like Teflon®. In very high temperature applications, it can be glass fiber or a metallic tubular sheath with a ceramic or similar material annularly isolating the central wire from the tubular sheath. 316 stainless steel or other stainless steels are often used for the tubular wire sheath. The wire's material and its gage are chosen to minimize the wire's resistance. Copper is usually used, but in high-temperature, corrosive environments special alloys may be used, such as nickel or silver alloys.

The two or three wires to the sensor are sealed into the end of the support sheath by means of a hermatic seal or any cementing or potting material meeting the purpose of this invention, such as cement, high temperature cement, or epoxy, etc. High temperature cement is used for high temperature applications. This also provides strain relief for the wires.

It is advantageous to connect two wires to one of the wire leads rather that one wire to each wire lead, because this facilitates correcting for the voltage drop in each lead. In the case of the two wires connected to a wire lead, one wire carries current used to self-heat the TMFS, and the other senses the voltage drop across the wire. By assuming that the resistance of each current carrying wire is identical, we eliminate the wires' resistance from the measurement of the resistance of the RTD. This eliminates the effect of changes in the wires' resistance due to changes in temperature along the wires, and thereby enhances the accuracy of the TMFM. The three-wire feature of the TMFS of the invention is not part of the invention, but rather is a good practice in the application of any RTD-based sensor.

We now describe how the TMFS of the invention reduces end loss. The aforementioned gland(s) which are slipped on the two wire leads are constructed of a material meeting the purpose of this invention and which has a relatively low thermal conductivity, is an electrical insulator, and is stable both physically and chemically. For high temperature applications the gland(s) must be of a material that can withstand high temperatures. Quartz, certain ceramics (not aluminum oxide), glasses, other forms of silicon dioxide, glassy materials, and other insulation materials are candidates for the gland material. The external diameter of the glands is less than the internal diameter of the support sheath. This creates the air gap shown in FIG. 7 which has the desirable effect of decreasing the convective heat transfer $Q_{C2}$ in Region 2. Additionally, as shown in FIG. 7 the length L of the gland(s) and the support sheath must be as long as is practicable. The combination of the low thermal conductivity (k) and long length (L) of the gland(s) increases the end loss thermal resistance ($R_{L1}$) for gland, because:

$$R_{L1} = \frac{L}{kA_c} \tag{7}$$

where Ac is the cross-sectional area of the gland. Similarly, a criterion for the selection of the material for the support sheath is that it meet the purpose of this invention and have a relatively low thermal conductivity because it also contributes to the end loss. The support sheath also has the practical requirements of ruggedness, corrosion-resistance, and physical and chemical stability. 316 stainless steel, 304 stainless steel, other stainless steels, nickel-based alloys, Hastelloy alloys, inconel alloys, ceramics, and polymers are candidate materials for the support sheath.

Since the improvements in the design of the TMFS of the invention increase the overall end loss thermal resistance of the TMFS, we see from Equation (4) that the end loss heat transfer $Q_L$ is reduced.

D. Specific Embodiment of the Invention

The previous two subsections describe the reasoning supportive of the design improvements of the TMFS of the invention, as well as the range of options in the choice of materials and geometry that are encompassed by the invention. This section gives a specific embodiment of the design of the invention which has been reduced to practice and for which the selection of the various options have been optimized. We shall call this the Specific Thermal Mass Flow Sensor, or STMFS.

Figure 10:
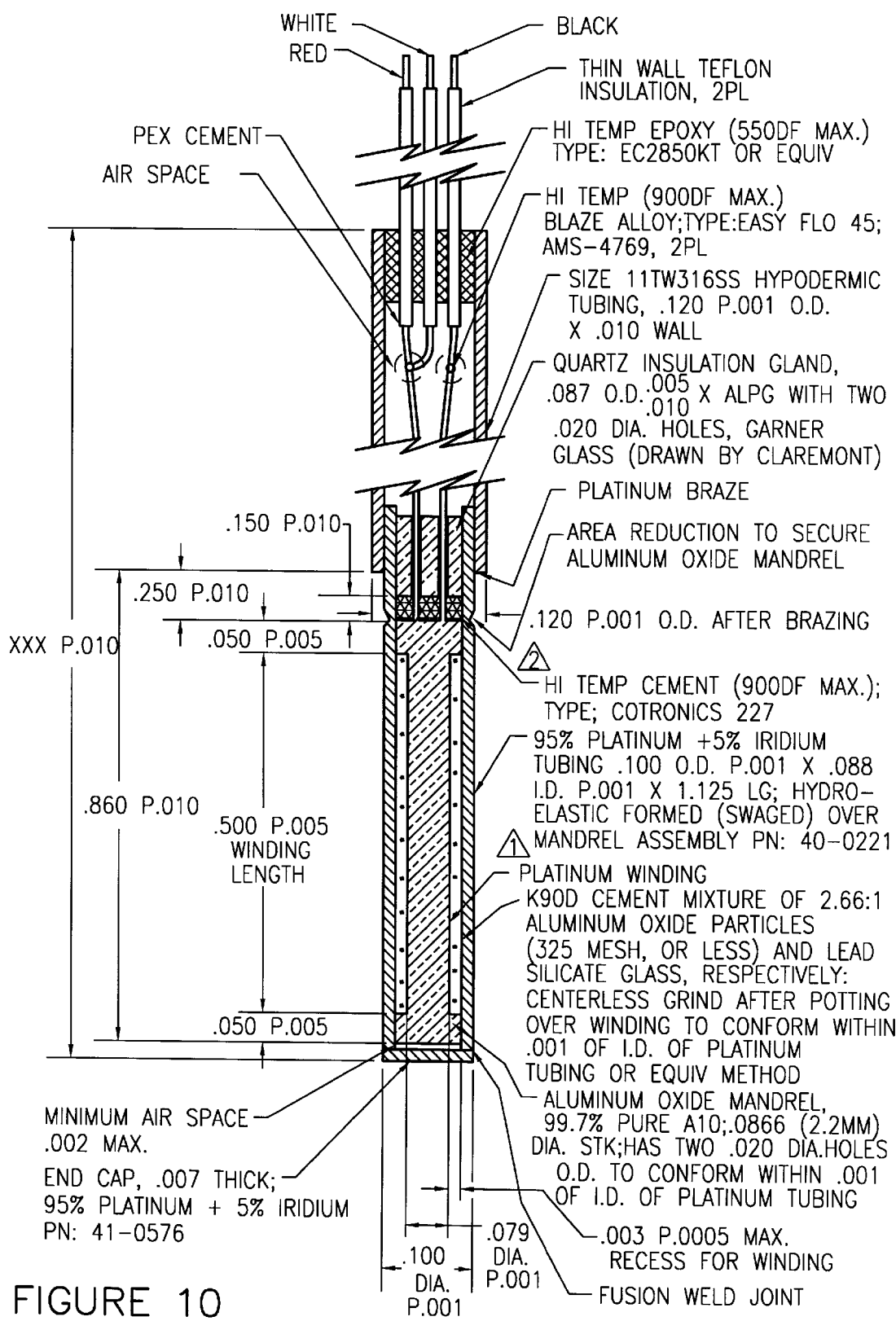

As shown in FIG. 10, the STMFS uses reference-grade platinum for the RTD winding because it is the most stable of all RTD materials. Its resistance is approximately 20 ohms. The main body of the STMFS is designed for high temperature operation up to 800° F. The use of Teflon coated copper wires and epoxy seal at the end of the support sheath limit its use to gases not exceeding 450° to 500° F. The use of other higher temperature insulation and seal materials can, as previously discussed, extend its application to 800°

F. The ceramic mandrel is aluminum oxide. The coating is a cement mixture of 2.66:1 aluminum oxide particles (325 mesh, or less) and lead silicate glass. The tip sheath is an alloy consisting of 95% platinum and 5% iridium. All four of these materials have approximately the same thermal coefficient of thermal expansion. This is in marked contrast to conventional TMFS's which have platinum windings and aluminum oxide mandrels having a coefficient of expansion approximately a factor of two different than their stainless steel sheath. The noble-metal platinum alloy tip sheath is highly corrosion resistant and has the toughness required for industrial applications. It hydroplastically forms over the mandrel subassembly at reasonably achievable pressures in the range of 5,000 to 10,000 psi. The platinum tip sheath also has the fortuitous advantage of a relatively high thermal conductivity (compared with stainless steel) which decreases the skin resistance ($R_S$). The diameter of the tip sheath is 0.100 inches. Larger diameters can provide more ruggedness, but may have impractical power requirements and end losses that are too high. Smaller diameters make the TMFS too fragile and difficult to construct.

The mandrel subassembly is sealed into the sheath tip with high temperature cement. The wire leads are platinum. The support sheath is 316 stainless steel, but also can be a Hastelloy or Inconel alloy. Stainless steels have a relatively low thermal conductivity compared to other metals. The outside diameter of the support sheath is 0.120 inches. The glands are constructed of quartz because it has a very low thermal conductivity and is highly stable. The length of the entire TMFS is 2.5 inches.

What is claimed is:

1. A thermal mass flow rate sensor for detecting the rate of flow of a fluid comprising:

a mandrel made of a material having a first co-efficient of thermal expansion;

a resistance temperature detector wire being wound about said mandrel to form a mandrel and wire assembly, said wire being made of a material having a second co-efficient of thermal expansion;

an elongated sensor sheath formed about said mandrel and wire assembly and in intimate contact with said mandrel and wire assembly, said sensor sheath in the region of said mandrel and wire assembly being made of a metal having a third co-efficient of thermal expansion, said first, second and third co-efficients of thermal expansion being approximately the same; and an insulating gland located in said sensor sheath, wherein an airgap is defined by said insulating gland and said sensor sheath.

2. A thermal mass flow rate sensor according to claim 1 wherein said insulating gland is made of quartz.

3. A thermal mass flow rate sensor according to claim 1 wherein said sensor sheath comprises a platinum alloy tip sheath formed about said mandrel and wire assembly in intimate contact with said mandrel and wire assembly.

4. A thermal mass flow rate sensor according to claim 3 wherein said sensor sheath further comprises a support sheath extending from said tip sheath, said support sheath and said insulating gland defining said airgap.

5. A thermal mass flow rate sensor according to claim 4 wherein said support sheath is made of stainless steel.

6. A thermal mass flow rate sensor according to claim 5 wherein said insulating gland is made of quartz.

7. A thermal mass flow rate sensor according to claim 4 wherein said resistance temperature detector wire is wound into a recess defined in said mandrel.

8. A thermal mass flow rate sensor according to claim 1 wherein said resistance temperature detector wire is wound into a recess defined in said mandrel.

* * * * *